(No Model.) 2 Sheets—Sheet 1.
O. R. F. WHITTEN.
SEED PLANTER AND GUANO DISTRIBUTER.
No. 565,949. Patented Aug. 18, 1896.
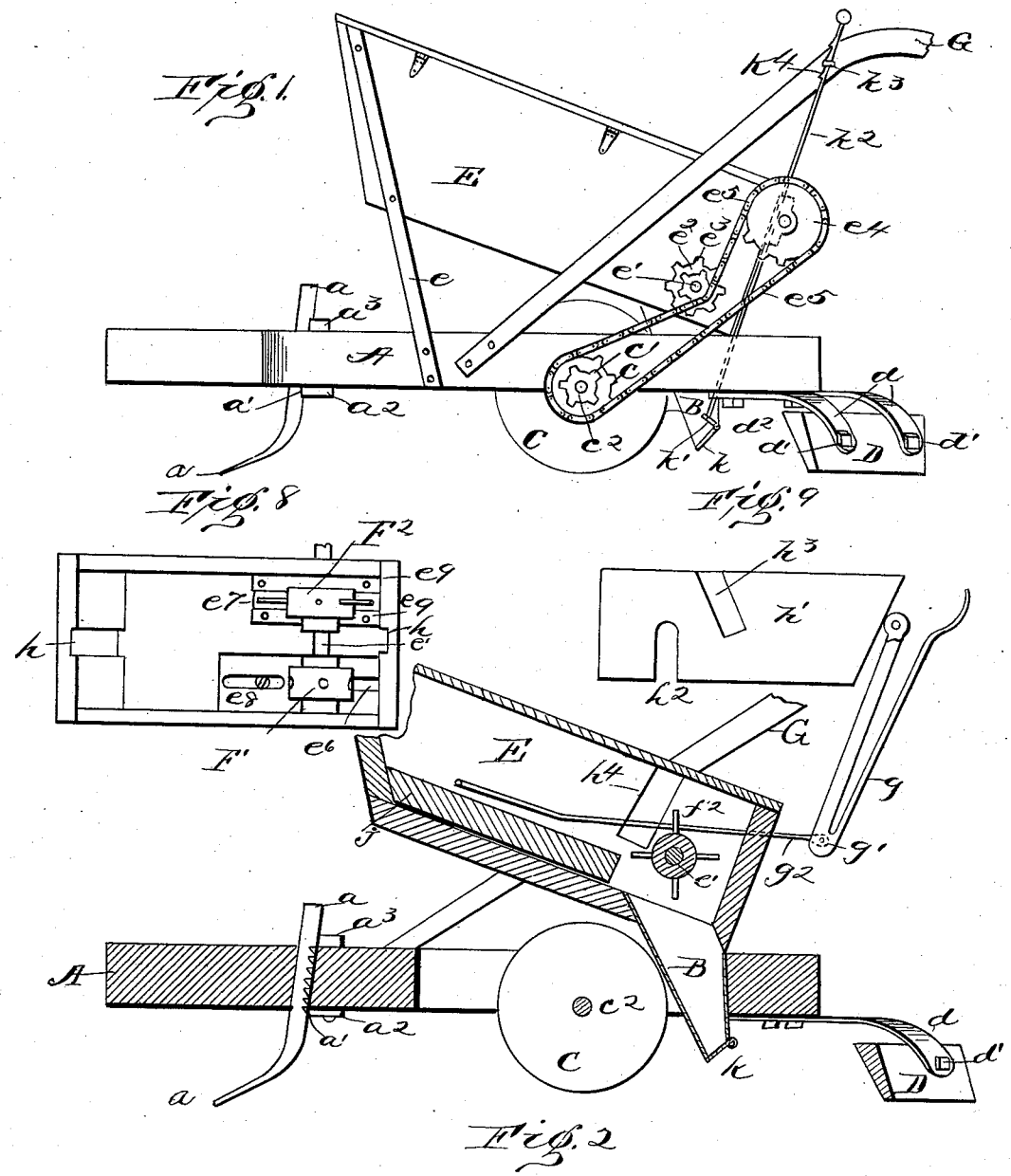

(No Model.) 2 Sheets—Sheet 2.
O. R. F. WHITTEN.
SEED PLANTER AND GUANO DISTRIBUTER.
No. 565,949. Patented Aug. 18, 1896.
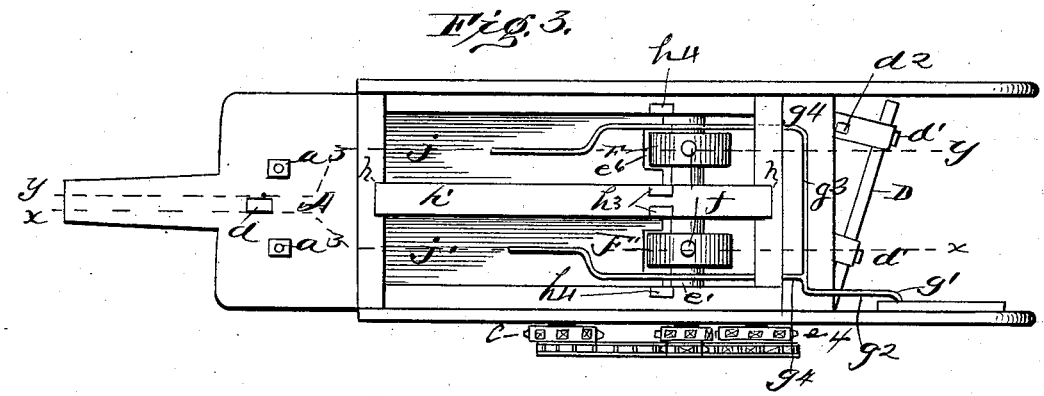
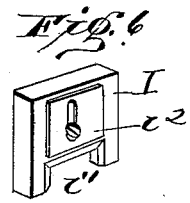
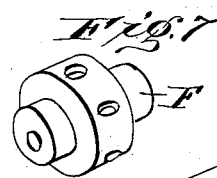
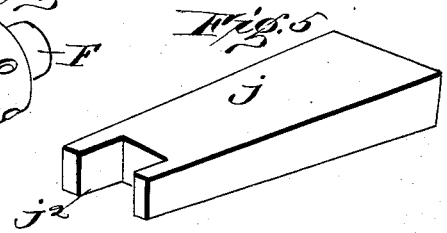
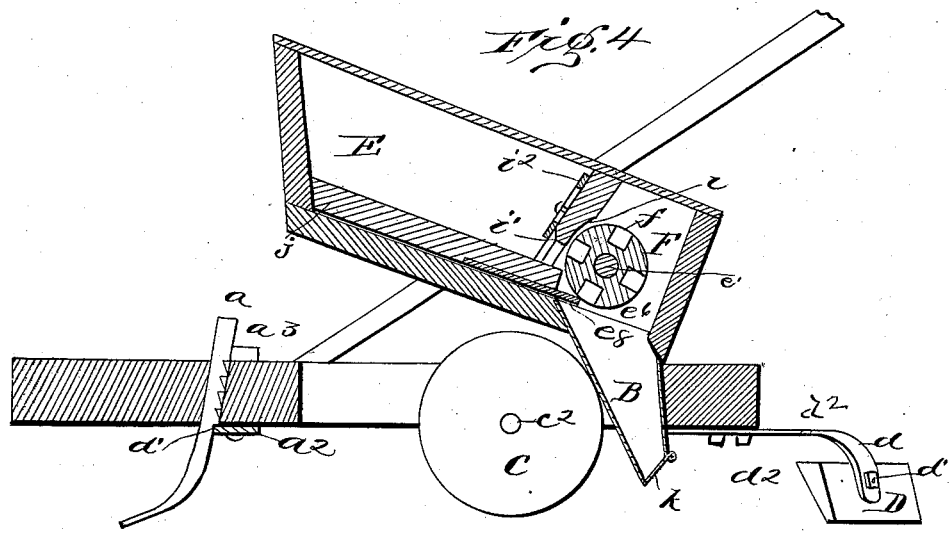

UNITED STATES PATENT OFFICE.

ORLANDO RANDOLPH FICKLIN WHITTEN, OF PRESCOTT, ARKANSAS.

SEED-PLANTER AND GUANO-DISTRIBUTER.

SPECIFICATION forming part of Letters Patent No. 565,949, dated August 18, 1896

Application filed February 15, 1896. Serial No. 579,426. (No model.)

*To all whom it may concern:*

Be it known that I, ORLANDO RANDOLPH FICKLIN WHITTEN, a citizen of the United States, residing at Prescott, in the county of Nevada and State of Arkansas, have invented certain new and useful Improvements in Seed-Planters and Guano-Distributers; and I do hereby declare the following to be a full, clear, and exact description of the invention, such as will enable others skilled in the art to which it appertains to make and use the same.

My invention is a combination seeder and fertilizer-distributer. It will plant corn, cotton, or other small grain. It will plant corn and peas, or any other kind of small grains, at the same time, and it will plant as many grains and at any distance apart desired, or it will plant grain and at the same time distribute a fertilizer.

In the accompanying drawings, Figure 1 is a side elevation of my invention. Fig. 2 is a vertical sectional view of Fig. 3 on the line $x\ x$, with the exception that in Fig. 3 a seed-wheel F' is shown on the axle $e'$, while in Fig. 2 a cotton-seed distributer $f^2$ is shown on said axle $e'$. Fig. 3 is a top plan view of my invention. Fig. 4 is a vertical sectional view of Fig. 3, cut on the line $y\ y$. Figs. 5, 6, 7, and 9 are detail views. Fig. 8 is a top plan view of the feed-box when it is used as a cotton-seed dropper.

My invention is described as follows:

A is the base-frame.

$a$ is the opener, having notches $a'$ in its rear edge, (see Fig. 2,) by means of which and the cross-bar $a^2$ and the bolts and nuts $a^3$ the same may be set at any depth.

B is the dropper-spout which carries the seeds and fertilizer to the furrow.

C is the traction-wheel on axle $c^2$ and has on the outer end of the axle a sprocket-wheel $c$ and a smaller sprocket-wheel $c'$.

Secured to the rear end of the base-frame A is a covering-board D, adjustably arranged by means of the curved bars $d$ and bolts and nuts $d'$. These bars each are provided with two perforations $d^2$, so that the said board D may be set at any angle in relation to the furrow.

Over the base-frame A is secured a seed-box E by means of the standards $e$, and in the rear end of the said box is journaled an axle $e'$, and on the outer end of said axle, and on a line with sprocket-wheels $c$ and $c'$, is secured a small sprocket-wheel $e^2$ and a larger sprocket-wheel $e^3$, and to the rear end of said box E is journaled another sprocket-wheel $e^4$, and around these sprocket-wheels work a sprocket-chain $e^5$. Said axle $e'$ works in suitable bearings secured to the side walls of the box E. In the bottom of said box E are slots $e^6$ and $e^7$. Over the slot $e^6$ is adjustably secured a slotted plate $e^8$, which may be slipped down and entirely close the said slot $e^6$. In the bottom of the box and on each side of the slot $e^7$ are metal strips $e^9$ (see Fig. 8) to regulate the breadth of the slot $e^7$, and thus regulate the amount of cotton-seed that may fall through said slot.

On the axle $e'$, and just above the slots $e^6$ and $e^7$, are secured seed-wheels F and F'. These wheels are each provided with grain-holes $f$, (see Fig. 3,) preferably four, but more or less may be used. Seed-wheel F' may be removed and a cotton-seed distributer $f^2$ may be put in its place.

To the handle G is hinged an elbow-lever $g$, and at its elbow there is a perforation $g'$, in which is pivoted the outer end of a seed-stirrer $f^2$, consisting of the pivoted arm $g^2$, cross-arm $g^3$, and parallel arms $g^4$. (See Fig. 3.) Said parallel arms work through the rear end of the box E, and on the upper faces of the false bottoms $j\ j'$ to agitate the contents of said box E. Said elbow-lever $g$ may be pivoted to either handle, or one may be secured to each handle.

In each end wall of the box are recesses $h$, Fig. 8, in which fits a partition $h'$, Fig. 9, having in its lower edge a notch $h^2$, which fits over the axle $e'$, and in each face of the partition $h'$ are recesses $h^3$, and in the side walls of the box, and corresponding to said slots, are recesses $h^4$, Fig. 3, and in said recesses fit blocks I, Figs. 4 and 6, having in their rear faces circular recesses $i$, (see Fig. 4,) and in their front faces beveled notches $i'$. The circular recesses are to fit the circumference of the wheels F and F', while the beveled notches are to direct the seeds or fertilizer into the slots $e^6\ e^7$, and to the front face of each of said blocks is adjustably secured, by means of a screw, a slotted door $i^3$, so that said notch $i'$ may be more or less closed and the flow of the seed regulated.

In the bottom of the box E, one on each side of the partition $h'$, are false bottoms $j$ and $j'$. (See Figs. 3, 4, and 5.) Said false bottoms are each provided at their rear ends with a notch $j^2$, which also fits the periphery of the wheels F F', and which are intended to assist in regulating the flow of the seeds or the fertilizer.

To plant two different kinds of grain at the same time, take off the cotton-seed distributer $f^2$ and put in place thereof the seed-wheel F', and put in the partition $h'$, blocks I, and false bottoms $j$ and $j'$, thus making the left side of the box the same as the right. The wheels F F' may be set on the axle $e'$, so that the seed-holes $f$ will be opposite to each other, and thus drop two kinds of seeds at the same time and in the same hill, or they may be so set that they will drop the different kinds of seed alternately any distance apart desired.

To plant cotton, take out the false bottoms $j$ $j'$, blocks I, and partition $h'$, adjust the slide $e^8$, and cover up the slot $e^6$, and you have a large box for the cotton-seed and with but one opening $e^7$ for the seeds to fall through, which opening may be enlarged or diminished by adjusting the strips $e^9$, Fig. 8.

To regulate the distance between the hills, you may fill some of the seed-holes $f$, and to regulate the quantity of the seeds to be dropped, you may partly fill the seed-holes, or you may use smaller wheels with smaller holes. Indeed, the holes may be so small and close together as to sow small grain. Also by the sprocket-wheels $c$ $c'$ $e^2$ $e^3$ being of different sizes, and two sizes on each axle, $c^2$ and $e'$, and running the sprocket-chain $e^5$ on the large wheel on one axle and small wheel on the other, will also change the distance.

The front end of the box E is higher than the rear end, so that the seeds to be planted or the material to be distributed will run down to the spout B, and so that they will always be in easy reach of the operator, to be stirred by the hand, if necessary, and so that he may easily see if the machine has become choked or otherwise inoperative. The said box may be provided with a lid to protect its contents in case of rain or other necessity, and also to keep its contents from spilling out in case the machine should be accidentally overturned.

At the mouth of the spout B is hinged a door $k$, provided with an elbow-arm $k'$, Fig. 1, and to said elbow-arm is pivoted a rod $k^2$, which extends upward and passes through a staple $k^3$ in one of the handles of the machine. Said rod is provided at its upper end with ratchet-teeth $k^4$, so that said door $k$ may be set open or shut at will. The purpose of this door is that the operator may close it to prevent the escape of seeds or fertilizer when passing around stumps, turning at the end of the row, or going from field to field.

Having described my invention, what I claim as new, and desire to secure by Letters Patent, is—

1. In a seed and fertilizer distributer, the combination of the box E; handle G; elbow-lever $g$, pivoted to said handle; stirrer $f^2$, consisting of the arm $g^2$, cross-rod $g^3$, and arms $g^4$; said arms $g^4$, working in said box E, substantially as shown and described and for the purposes set forth.

2. In a seed and fertilizer distributer, the combination of the box E; handle G; elbow-lever $g$, pivoted to said handle; stirrer $f^2$, consisting of the arm $g^2$, cross-rod $g^3$, and arms $g^4$; said arms $g^4$, working in said box E; box E, provided with the slots $e^6$, $e^7$; plates $e^9$, adapted to close slot $e^7$, and plate $e^8$, adapted to close slot $e^6$, substantially as shown and described and for the purposes set forth.

3. In a seed and fertilizer distributer, substantially as shown and described, the box E, having the end recesses $h$, side recesses $h^4$; axle $e'$, working in bearing in said box; wheels F and F', secured to said axle; partition $h'$, having slot $h^2$, and recesses $h^3$, fitting in said box; block I, having recesses $i$, notches $i'$, slide-doors $i^2$, fitting in recesses $h^3$ and $h^4$, and false bottoms $j$, $j'$, having recesses $j^2$, fitting in said box, substantially as shown and described and for the purposes set forth.

4. In a seed and fertilizer distributer, substantially as shown and described, the box E, having the end recesses $h$, side recesses $h^4$; axle $e'$, working in bearings in said box; wheels F and F', secured to said axle adapted to carry seed-wheels; partition $h'$, having slot $h^2$, and recesses $h^3$, fitting in said box; blocks I, having recesses $i$, notches $i'$; slide-doors $i^2$, fitting in recesses $h^3$, and $h^4$, and false bottoms $j$, $j'$, having recesses $j^2$, fitting in said box, substantially as shown and described and for the purposes set forth.

In testimony whereof I affix my signature in presence of two witnesses.

ORLANDO RANDOLPH FICKLIN WHITTEN.

Witnesses:
W. E. ARNOLD,
E. R. ARMISTEAD.